No. 831,731. PATENTED SEPT. 25, 1906.
F. C. MILLIKEN.
WHEEL CONSTRUCTION.
APPLICATION FILED JAN. 3, 1906.
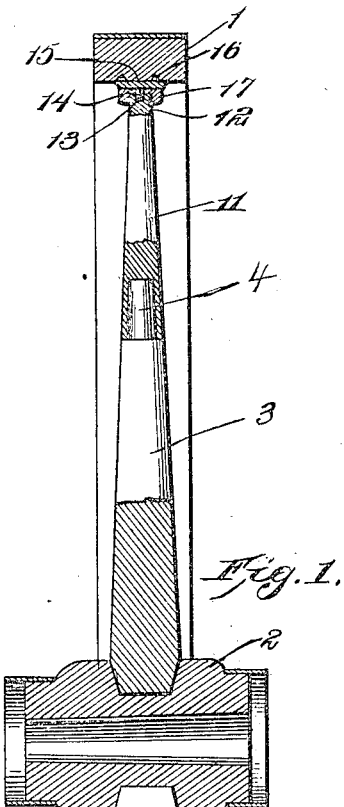
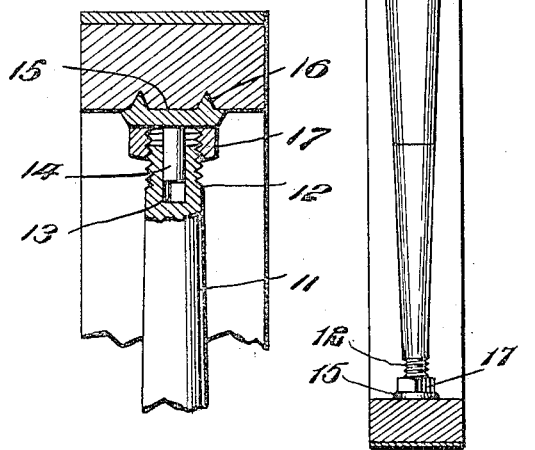
Witnesses
Inventor
Francis C. Milliken
By W. J. FitzGerald
Attorneys

UNITED STATES PATENT OFFICE.

FRANCIS C. MILLIKEN, OF EAST PARSONFIELD, MAINE.

WHEEL CONSTRUCTION.

No. 831,731. Specification of Letters Patent. Patented Sept. 25, 1906.

Application filed January 3, 1906. Serial No. 294,444.

*To all whom it may concern:*

Be it known that I, FRANCIS C. MILLIKEN, a citizen of the United States, residing at East Parsonfield, in the county of York and State of Maine, have invented certain new and useful Improvements in Wheel Construction; and I do hereby declare the following to be a full, clear, and exact description of the invention, such as will enable others skilled in the art to which it appertains to make and use the same.

My invention relates to wheels, and relates more particularly to spokes which are adapted to be extended or shortened for the purpose of setting tires thereon or for removing the tires and spokes.

The invention consists of a spoke, which is seated at one end in a metallic socket, having a threaded stem adapted to be connected to a felly and having means for exerting an outward pressure upon the rim of a wheel, so as to tighten the tire thereon.

The invention also consists of the further novel features of construction and combination of parts, the preferred form whereof will be hereinafter made clearly apparent, and pointed out in the claims.

In the accompanying drawings I have shown the preferred form of my invention.

In said drawings, Figure 1 is a sectional view through a wheel, showing my improved invention applied thereto; and Fig. 2 is an enlarged sectional view of the wheel-rim, showing my improved device secured thereto.

Referring to the figures by numerals of reference, 1 is a felly or rim of a wheel which is disposed around the usual form of hub 2, said hub being provided with a plurality of spokes 3, which are provided at their outer ends with a reduced portion 4, said reduced portion being adapted to be disposed into a socket 11. The upper end of the socket 11 is threaded at 12 and is provided with a recess 13 to receive a stem 14, projecting inward from a disk 15. The outer surface of the disk 15 is provided with spurs 16, which are adapted to engage the inner or concaved face of the felly when outward pressure is exerted thereon. A nut 17 is disposed on the threaded portion 12 of the socket 11, and by this means the disk 15 is directed outwardly and the spurs forced into engagement with the felly, and by continued rotation of the nut the felly is spread radially. The stem 14 is preferably formed integral with the disk 15 and is of sufficient length to engage the recess 13 even when the disk 15 is adjusted outwardly to its full extent.

It will be seen that by this construction the socket may be placed on the spoke and into position on the felly when the wheel is assembled, and it will be further seen that the felly can be quickly enlarged radially, so as to bind upon the tire, and any one or more of the spokes can be quickly lengthened or shortened by properly manipulating the nut 17 outward or inward upon the threaded portion 12 of the socket 11.

What I claim is—

1. In a wheel, the combination with a hub, felly and spokes extending from the hub; of sockets upon the outer ends of the spokes, each socket having a threaded portion, a disk interposed between the socket and felly, means upon the disk for engaging the felly, a stem integral with the disk slidably mounted within the socket, and means on the socket for exerting outward pressure upon the disk.

2. In a wheel, the combination with a hub, spokes extending from the hub, and a felly; of sockets surrounding the outer reduced ends of the spokes, the extreme upper end of said socket being externally threaded and provided with a recess, a disk interposed between said socket and felly, spurs on said disk adapted to engage said felly, a stem integral with said disk and extending into said recess, and a nut engaging the threaded portion of the socket and adapted to be disposed against the disk to exert outward pressure on the felly.

In testimony whereof I have signed my name to this specification in the presence of two subscribing witnesses.

FRANCIS C. MILLIKEN.

Witnesses:
 NOAH WEEKS,
 IDA J. MERRILL.